US008554366B2

(12) United States Patent
Kajima

(10) Patent No.: US 8,554,366 B2
(45) Date of Patent: Oct. 8, 2013

(54) LEGGED MOBILE ROBOT AND METHOD OF CONTROLLING THE SAME

(75) Inventor: Hideki Kajima, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 943 days.

(21) Appl. No.: 12/596,461

(22) PCT Filed: Apr. 9, 2008

(86) PCT No.: PCT/JP2008/056968
§ 371 (c)(1),
(2), (4) Date: Oct. 19, 2009

(87) PCT Pub. No.: WO2008/133002
PCT Pub. Date: Nov. 6, 2008

(65) Prior Publication Data
US 2010/0138043 A1    Jun. 3, 2010

(30) Foreign Application Priority Data
Apr. 20, 2007  (JP) ................................. 2007-112045

(51) Int. Cl.
*G06F 19/00*   (2011.01)

(52) U.S. Cl.
USPC ........... 700/245; 700/251; 700/253; 700/258; 700/260; 700/261; 318/568.12

(58) Field of Classification Search
USPC ................. 700/245, 251, 253, 258, 260, 261; 318/568.12, 568.16, 568.17, 568.2, 568.22
See application file for complete search history.

(56) References Cited

U.S. PATENT DOCUMENTS

| 5,151,859 | A | * | 9/1992 | Yoshino et al. ................. 701/23 |
| 5,221,883 | A | * | 6/1993 | Takenaka et al. ........ 318/568.12 |
| 5,349,277 | A | * | 9/1994 | Takahashi et al. ....... 318/568.12 |
| 5,355,064 | A | * | 10/1994 | Yoshino et al. .......... 318/568.12 |

(Continued)

FOREIGN PATENT DOCUMENTS

| JP | 5-237776 | 9/1993 |
| JP | 5-245780 | 9/1993 |

(Continued)

OTHER PUBLICATIONS

Notice of Reasons for Rejection, Japanese Patent Application No. 2007-112045, mailing date Jun. 14, 2011.

*Primary Examiner* — Khoi Tran
*Assistant Examiner* — Jaime Figueroa
(74) *Attorney, Agent, or Firm* — Finnegan, Henderson, Farabow, Garrett & Dunner, LLP

(57) ABSTRACT

When a swinging leg (e.g., the leg link LR) lands on road surface, a control unit 14 included in a robot 100 controls an actuator 15 driving an ankle joint 122 to make the ankle joint 122 in a leg link LR soft and changes a real angle of the ankle joint 122 according to road profile, not to follow a prespecified trajectory of target angle. Further, after the leg link LR lands, the control unit 14 corrects the trajectory of the target angle of the ankle joint 122 to cancel out a difference between the real angle of the ankle joint 122 and the target angle. Moreover, the control unit 14 controls the actuator 15 to make the ankle joint 122 hard, so that the real angle of the ankle joint 122 of the leg link LR, a supporting leg, follows the corrected trajectory of the target angle.

12 Claims, 9 Drawing Sheets

(56) References Cited

U.S. PATENT DOCUMENTS

| | | | | |
|---|---|---|---|---|
| 5,404,086 A | * | 4/1995 | Takenaka et al. | 318/568.12 |
| 5,432,417 A | * | 7/1995 | Takenaka et al. | 318/568.12 |
| 5,459,659 A | * | 10/1995 | Takenaka | 700/260 |
| 6,915,230 B2 | * | 7/2005 | Kawai et al. | 702/139 |
| 6,920,374 B2 | * | 7/2005 | Takenaka et al. | 700/245 |
| 6,992,456 B2 | * | 1/2006 | Furuta et al. | 318/568.12 |
| 2004/0172165 A1 | * | 9/2004 | Iribe et al. | 700/245 |
| 2005/0165507 A1 | * | 7/2005 | Shimizu et al. | 700/245 |
| 2005/0240307 A1 | * | 10/2005 | Kuroki et al. | 700/245 |

FOREIGN PATENT DOCUMENTS

| | | |
|---|---|---|
| JP | 5-253866 | 10/1993 |
| JP | 2520019 | 5/1996 |
| JP | 2819323 | 8/1998 |
| JP | 2000-296484 | 10/2000 |
| JP | 2001-322076 | 11/2001 |
| JP | 2004-276167 | 10/2004 |
| JP | 2005-74528 | 3/2005 |
| JP | 2005-153038 | 6/2005 |
| JP | 2005-153119 | 6/2005 |
| WO | WO00/59688 | 10/2000 |

* cited by examiner $\theta ref\_c1 = \theta ref + \Delta ini$ $\theta ref\_c2 = \theta ref\_c1 + \Delta \phi$

LEGGED MOBILE ROBOT AND METHOD OF CONTROLLING THE SAME

CROSS-REFERENCE TO RELATED APPLICATIONS

This application is a national phase application of International Application No. PCT/JP2008/056968, filed Apr. 9, 2008, and claims priority of Japanese Application No. 2007-112045, Apr. 20, 2007, the contents of which are incorporated herein by reference.

TECHNICAL FIELD

The present invention relates to a legged mobile robot which walks by operating multiple leg links, and particularly to an operation control of a legged mobile robot when the leg link is landing on the road surface.

BACKGROUND ART

For example, the patent document 1 discloses a legged mobile robot, including a trunk unit and two leg links connected to the trunk unit, which walks by alternately advancing the two leg links and landing on the road surface. Generally, a legged mobile robot performs an inverse kinematic calculation based on gait data, which is created on the assumption of a known road surface, and calculates target angles of leg joints such as an ankle joint and a knee joint in order to achieve a trajectory of each section described in the gait data. Note that the gait data is time series data including, for example, a ZMP (Zero Moment Point) trajectory, a center of gravity trajectory, a trajectory of the trunk unit, and a trajectory of foot provided to a tip of the leg link via the ankle joint. Then, the legged mobile robot performs a walking motion by driving leg joints to follow the trajectory of the target angles calculated chronologically. That is, the legged mobile robot is provided with a servo mechanism to make a real angle of the leg joint follow the trajectory of the target angle.

[Patent Document 1]
Japanese Unexamined Patent Application Publication No. 5-245780

DISCLOSURE OF INVENTION

Technical Problem

However, if a legged mobile robot walks on an uneven road surface having unknown bumps, the trajectory of the target angle specified in advance based on the known road profile is not necessarily the optimal trajectory for a stable walking motion. That is, even if the real angle of the leg joint is made to follow the target angle, which is specified based on the known road profile, it is difficult for the legged mobile robot to continue stable walking, and at worst, it could cause a falldown of the robot.

One of the effective control methods for the legged mobile robot to walk the uneven road surface with unknown bumps is to make for example the ankle joint, one of the leg joints, soft before the foot lands on the road surface, and passively change the ankle joint angle by the reaction force from the road surface acting on the foot, so that the ankle joint angle is conformed to the road profile.

However, if the leg joint is passively conformed to the road profile, a deviation is generated between the real angle of the leg joint immediately after landing and the prespecified target angle. If the influence on the robot walk by this deviation is not appropriately corrected, following walk will be unstable using the landed leg link as a new supporting leg. More specifically, as the joint of the leg link, which is used as the supporting leg after landing, rapidly follows the target angle, center of gravity position of the legged mobile robot may rapidly change. Further, as described above, the trajectory of the target angle previously specified based on the known road profile may not be an appropriate trajectory. In such case, even if the leg joint follows the original target angle, the legged mobile robot cannot perform a stable walking motion.

The present invention is made in consideration of the abovementioned problem, and the object of the present invention is to suppress from generating an unstable behavior of the legged mobile robot caused by the leg joint following to the target angle different from a real angle when the leg joint is made hard again in order for the real angle of the leg joint, which has changed conforming to the road profile, to follow the target angle.

Technical Solution

In accordance with a first aspect of the present invention, a walking control method of a legged mobile robot provided with a plurality of leg links perform the following processes. Firstly, when a first leg link, which is a swinging leg among the plurality of leg links, is landing on a road surface, controlling a driving unit for driving a first leg joint included in the first leg link so that the first leg joint is made soft in order to change a real angle of the first joint of the first leg unit link landing on the road surface according to a shape of the road surface without following a trajectory of a target angle determined beforehand. Further, after the first leg link lands, correcting the trajectory of the target angle to cancel out a difference between the real angle of the first leg joint and the target angle. Moreover, controlling the driving unit so that the first leg joint is made hard in order for the real angle of the first leg joint of the first leg link, which has become a supporting leg, to follow the corrected trajectory of the target angle.

As described above, the method in accordance with the first aspect of the present invention corrects the prespecified trajectory of the target angle to cancel out the difference between the real angle of the leg joint and the target angle, which is a control target, where the difference is generated when the leg link lands while the leg joint is soft. If the leg joint is made hard again so that the real angle of the leg joint, which changed conforming to the road profile, follows the target angle, it is possible to suppress from generating an unstable behavior of the legged mobile robot, caused by the leg joint rapidly following the target angle different from the real angle.

Note that in the abovementioned first aspect of the present invention, the softness of the first joint can be changed by changing the following speed to the target angle of the first joint. Further, the softness of the first joint may be changed by increasing or decreasing an output torque of the driving unit.

Moreover, the correction of the target angle in accordance with the first aspect of the present invention may be carried out by adding to the target angle, the difference between the real angle of the first joint at the time of making the first joint hard and the target angle. This enables to easily correct the deviation between the real angle of the leg joint and the prespecified target angle.

Note that the abovementioned correction of the target angle in accordance with the first aspect may be performed by adding to the target angle, the difference between the real angle of the first joint at the time of making the first joint hard and the target angle, and the difference between the target posture angle of a trunk unit of the legged mobile robot, to which the plurality of leg links are connected, and the real posture angle. In a case there is an error in the measured value of the real angle of the first joint when the first joint is made hard, in a case there is an error in the real angle of the first joint and the target angle, or in a case that the contact state between the leg link and the road surface changes, where the leg link is to be a supporting leg after calculating the difference between the real angle of the first joint and the target joint, it is possible to suppress from generating a position error of a subsequently landing leg link with the first leg link as a supporting leg. This enables to stabilize the walking motion.

Moreover, in the abovementioned first aspect, the correction amount for the target angle may be set to zero after the first leg link enters the swinging phase again. This enables to make the posture of the first leg link at the time when the first leg link lands again as a swinging leg (the posture determined by the first joint angle) be the prespecified posture according to the target angle θref(t). Accordingly, it is possible to prevent an unexpected collision or the like of the first leg link with an object inside the walking environment, which is caused by continuing the posture of the first leg link, where the posture is changed by bumps etc. on the road surface in the past.

An example of the leg joint in accordance with the abovementioned first aspect is an ankle joint rotatably supporting a foot provided to a tip of the leg link. Another example of the leg joint is a toe joint for operating the toe unit provided to the foot against a foot base unit.

In accordance with a second aspect of the present invention, a legged mobile robot includes a trunk unit, a plurality of leg links coupled to the trunk unit, each leg link having at least one leg joint, a driving unit which drives the leg joint, and a control unit which controls the driving unit so that a real angle of the leg joint follows a trajectory of a target angle specified beforehand. The control unit controls the driving unit so that a first leg joint of a first leg link, which is a swinging leg among the plurality of leg links, is made soft when the first leg link lands on the road surface, and therefore the real angle of the first joint will not follow the trajectory of the target angle but changes according to the road profile. Further, after the first link landed, the control unit corrects the trajectory of the target angle based on the difference between the real angle of the first leg joint and prespecified target angle, as well as controlling the driving unit so that the first leg joint is made hard, so that the real angle of the first joint of the first link, which has become a supporting leg, follows the corrected trajectory of the target angle.

As described above, the legged mobile robot in accordance with the second aspect of the present invention also corrects the trajectory of the prespecified target angle based on the difference between the real angle of the leg joint and the target angle, which is a control target, where the difference is generated when the leg link lands while the leg joint is soft. If the leg joint is made hard again so that the real angle of the leg joint which changed conforming to the road profile follows the target angle, it is possible to suppress from generating an unstable behavior of the legged mobile robot, caused by the leg joint rapidly following the target angle different from the real angle.

Advantageous Effects

When the leg joint is made hard again in order for the real angle of the leg joint to follow the target angle, where the real angle has changed conforming to the road profile, the present invention enables to suppress from generating an unstable behavior of the legged mobile robot, caused by the leg joint following the target angle different from the actual angle.

EXPLANATION OF REFERENCE

Figure 1:
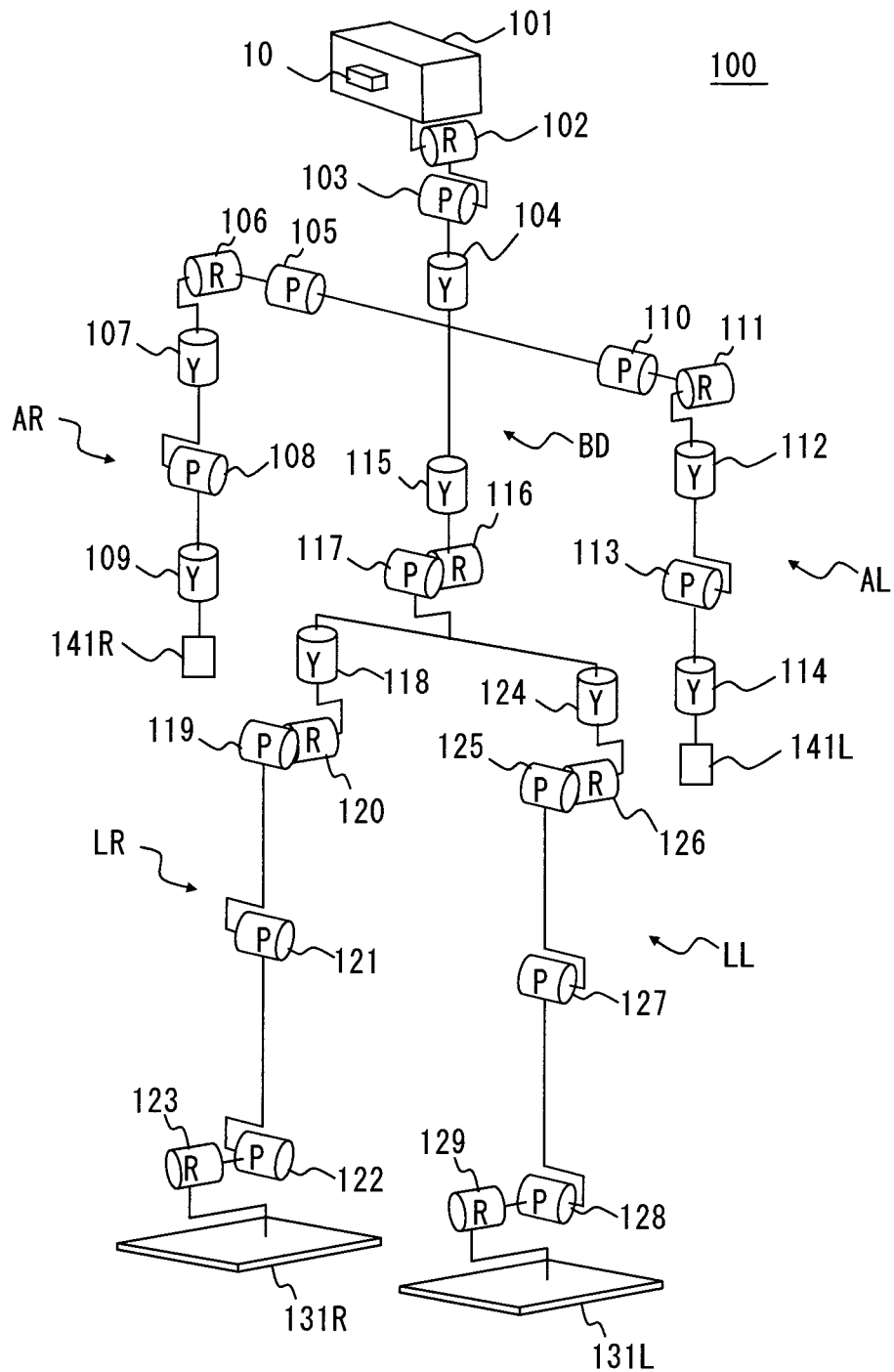
FIG. 1 is a model diagram of a legged mobile robot in accordance with a first exemplary embodiment of the present invention.

100 LEGGED MOBILE ROBOT
10 VISUAL SENSOR
11 ENVIRONMENTAL MAP GENERATION UNIT
12 GAIT DATA GENERATION UNIT
13 MOTION GENERATION UNIT
14 CONTROL UNIT
15 ACTUATOR
16 ENCODER
122 and 128 ANKLE JOINT (PITCH DIRECTION)
131R and 131L FOOT
50 ROAD SURFACE
51 BUMP
BD TRUNK UNIT
AR RIGHT ARM LINK
AL LEFT ARM LINK
LR RIGHT LEG LINK
LL LEFT LEG LINK

BEST MODE FOR CARRYING OUT THE INVENTION

Specific exemplary embodiments incorporating the present invention are described in detail with reference to the drawings. In the drawings, components identical are denoted by the same signs. Further, duplicated explanation for the same components may be omitted.

First Exemplary Embodiment

A robot 100 in accordance with this embodiment is a legged mobile robot having two leg links. Firstly, the degree of joint freedom of the robot 100 is described with reference to FIG. 1. FIG. 1 is a model diagram showing the robot 100 illustrated by joints and links connecting between the joints. The robot 100 includes a head unit 101, two leg links LR and LL, two arm links AR and AL, and a trunk unit BD to which the preceding components are connected.

A visual sensor 101 for acquiring external three-dimensional point data, which is range image data, is provided to the head unit of the robot 100. A neck joint for supporting the head unit 101 includes a roll direction joint 102, a pitch direction joint 103, and a yaw direction joint 103. The right arm link AR includes a pitch direction shoulder joint 105, a roll direction shoulder joint 106, a yaw direction upper arm joint 107, a pitch direction elbow joint 108, and a yaw direction wrist joint 109, and a hand unit 141R is provided to an end of the right arm link AR. The mechanism of the hand unit 141R may be determined according to the shape and type of an object to hold, for example the hand unit 141R may have the structure with multiple joints with several fingers and also multiple degrees of freedom.

The structure of the left arm link AL is same as the right arm link AR. Specifically, the left arm link AL has 5 joints 110 to 114 and a hand unit 141L at the end thereof.

The right leg link LR includes a yaw direction hip joint 118, a pitch direction hip joint 119, a roll direction hip joint 120, a pitch direction knee joint 121, a pitch direction ankle joint 122, and a roll direction ankle joint 123. A foot 131R is provided underneath the ankle joints 122 and 123.

The structure of the left leg link LL is same as the right leg link LR. Specifically, the left leg link LL has 6 joints 124 to 129 and a foot 131L at the end thereof.

A trunk unit 143 includes a yaw direction joint 115, a roll direction joint 116, and a pitch direction joint 117.

Figure 2:
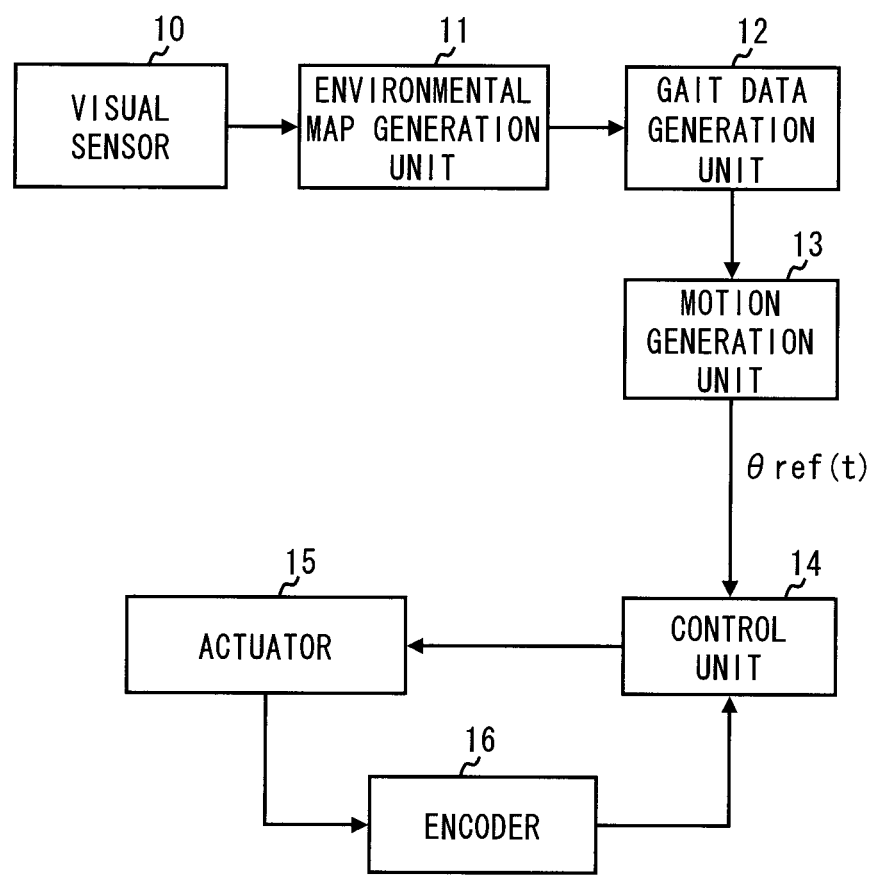
FIG. 2 is a block diagram showing a control system of the legged mobile robot in accordance with the first exemplary embodiment of the present invention.

The control system to cause the robot 100 to walk is described hereinafter. A configuration example of the control system of the robot 100 is shown in FIG. 2. In FIG. 2, the visual sensor 10 acquires the range image data external to the robot 100, as mentioned above. Specifically, the visual sensor 10 may be an active distance sensor such as a laser range finder or the like. Incidentally, the visual sensor 10 includes multiple cameras having image pickup devices such as CCD (Charge Coupled Device) image sensors or CMOS (Complementary Metal Oxide Semiconductor) image sensors, and the visual sensor 10 may generate the range image data using the image data captured by the multiple cameras. Specifically, the visual sensor 10 may detect corresponding points from the image data captured by multiple cameras and restore three-dimensional positions of the corresponding points in stereo vision. Here, the search for the corresponding points in multiple captured images may be carried out by well-known techniques such as a gradient method using a constraint equation of time-space differential for the multiple captured images and a correlation method or the like.

The environmental map generation unit 11 uses the range image data to generate an environmental map for the environment where the robot 100 is positioned therein. The environmental map is generated as a set of multiple planes detected from the range image data, for example.

The gait data generating unit 12 refers to the environmental map generated by the environmental map generation unit 11 to determine a target reaching position, and generates gait data in order to reach to the determined target reaching position. The gait data here includes a ZMP trajectory of the robot 100, the center of gravity trajectory of the robot 100, and trajectories of the landing position of the feet 131R and L, for example.

The motion generation unit 13 inputs the gait data, performs an inverse-kinematic calculation, and generates the trajectories of the target angles for the joints in order to achieve the gait data. The trajectories of the target angles generated here include the target angle trajectory θref(t) of the pitch direction angle joints 122 and 128 which support the feet 131R and L.

The control unit 14 inputs the calculated target angle trajectory of each joint and a real angle of each joint measured by the encoder 16, performs a feedback control, and calculates a torque control value for driving each joint. The actuator 15 drives each joint according to the torque control value calculated by the control unit 14, so that the robot 100 performs a walking motion.

In consideration of the possibility of unknown bumps existing on the road surface where the robot 100 walks, and position error of the leg links LR and LL or the like due to a flexure of the robot 100 itself, it is difficult for the robot 100 to walk by strictly following to the precalculated trajectory of the target angle. Therefore, when the foot of the swinging leg (the foot 131R or L) lands on the road surface, the robot 100 makes the ankle joint 122 or 128 be in a soft state beforehand, and passively changes the ankle joint angle by the reaction force from the road surface that acts on the foot 131R or L landed on the road surface. That is, when the swinging leg lands, the robot 100 makes the ankle joint angle be conformed to the road profile.

The soft state of the ankle joints 122 and 128 means the state in which the ankle joints 122 and 128 do not follow the prespecified target angle θref(t), and the real angles thereof vary according to the road profile contacting the feet 131R and L. Specifically, a feedback control gain applied to the control unit 14 is reduced for the swinging leg's the ankle joint 122 or 128 to follow the target angle, and the following speed to the target angle of the swinging leg's ankle joint may be reduced. Alternatively, the following speed to the target angle of the ankle joint of the swinging leg can be reduced by limiting the maximum value of an output torque of the actuator 15 which drives the swinging leg side of the ankle joint 122 or 128.

Figure 3:
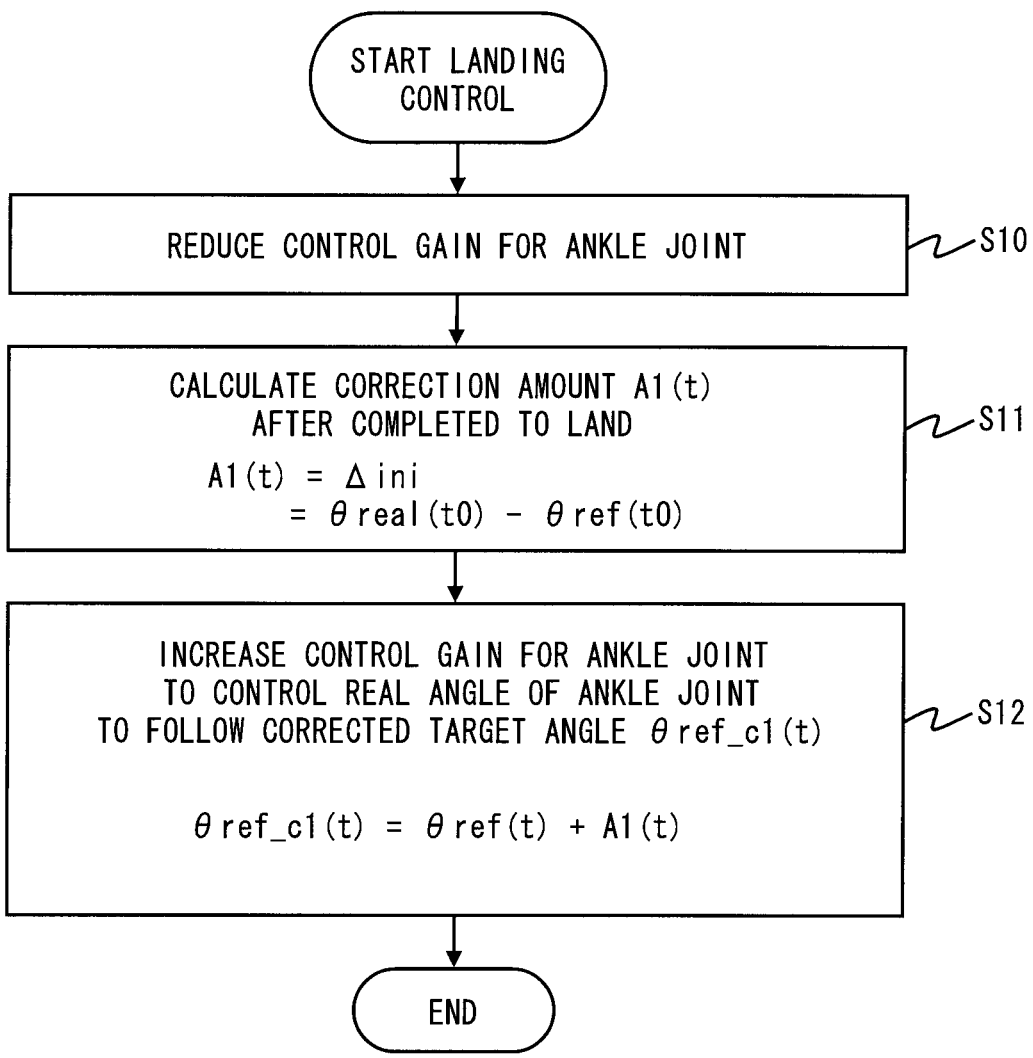
FIG. 3 is a flowchart showing a landing control process of a leg link in the legged mobile robot in accordance with the first exemplary embodiment of the present invention.

The control process performed mainly by the control unit 14 is described hereinafter, where the control process is for switching the landed leg link to the supporting leg and continuing the walking motion after the foot of the swinging leg among the leg links landed on the road surface while the ankle joint is soft. FIG. 3 is a flowchart showing the control procedure performed by the control unit 14 when the swinging leg among the leg links lands. Note that in the explanation below, an example is explained, in which the leg link LR in a swinging phase lands.

In step S10, the control unit 14 reduces the feedback control gain for the ankle joint 122 of the leg link LR in the swinging phase so as to reduce the following speed to the target angle θref(t) of the ankle joint 122. That is, the ankle joint 122 is made to be the state that can be flexibly changed conforming to the road profile.

In step S11, after the leg link LR has completed to land, a correction amount A1(t) to the target joint trajectory θref(t) of the ankle joint 122 is calculated. Incidentally, the landing completed point of the leg link LR may be determined based on the landing point of the foot 131R, which is specified by the gait data. Further, a contact sensor (not shown) and a force sensor (not shown) may be provided to the foot 131R, and the contact state between the bottom surface of the foot 131R and the road surface is detected using the detection result of the sensors in order to determine the landing completed point.

In this embodiment, the correction amount A1(t) at a certain time t is calculated by the following formula (1). In the formula (1), the time t0 is the landing completed point. Further, θreal is a real angle of the ankle joint 122 measured by the encoder 16. That is, in this embodiment, a difference Δini between the real angle θreal(t0) of the ankle joint 122, which has changed conforming to the road profile, and the target angle θref(t0) is the correction amount A1(t).

$$A1(t)=\Delta ini=\theta real(t0)-\theta ref(t0) \quad (1)$$

Figure 4A:
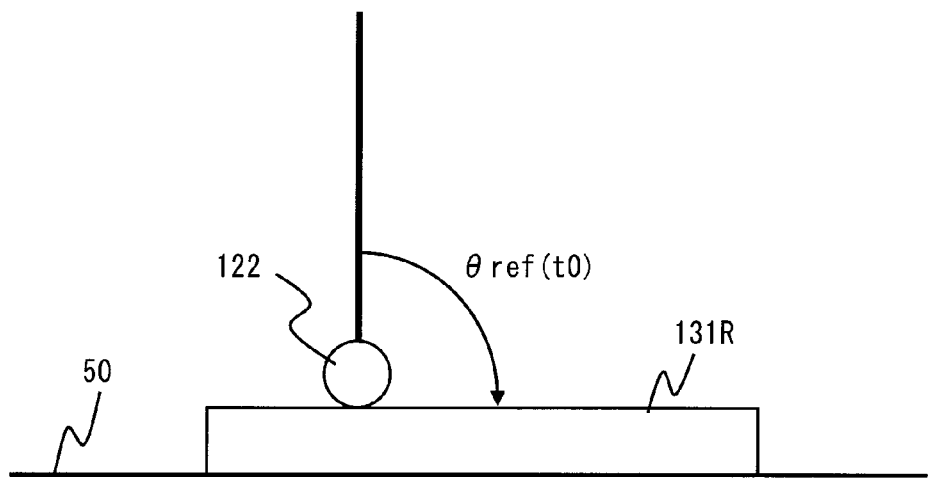
FIG. 4A is a leg unit enlarged diagram of the legged mobile robot in accordance with the first exemplary embodiment of the present invention.
Figure 4B:
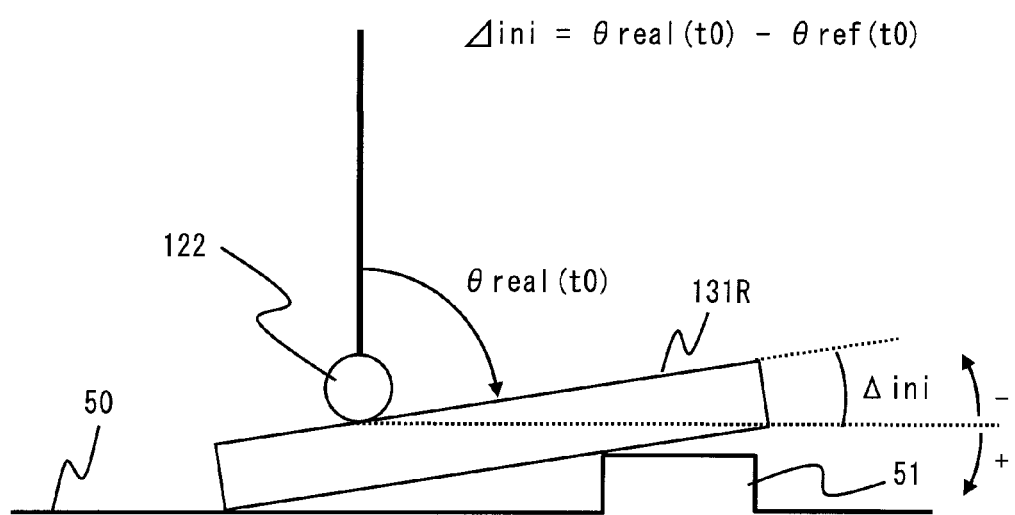
FIG. 4B is a leg unit enlarged diagram of the legged mobile robot in accordance with the first exemplary embodiment of the present invention.

FIG. 4A shows an ideal state where there is no unknown bumps on the road surface 50, and the real angle θreal(t0) matches the prespecified target angle θref(t0) at the landing completed point t0. On the other hand, FIG. 4B shows a case in which an unknown convex bump exists at the landing position of the foot 131R. As in FIG. 4B, if the convex bump 51 exists to the toe side of the foot 131R, the ankle joint changes according to the shape of the convex bump 51. Therefore, the real angle θreal(t0) of the ankle joint 122 at the landing completed point t0 is smaller than the target angle θref(t0). Accordingly, in case of FIG. 4B, the difference Δini, i.e. the correction amount A1(t), calculated according to the definition of the formula (1), is a negative value.

Turning back to FIG. 3 to continue the explanation. In step S12, the control unit 14 increases the control gain of the ankle joint 122, and controls in a way that the real angle θreal(t) of the ankle joint 122 follows the corrected target angle θref_c1(t). The corrected target angle θref_c1(t) here may be calculated using the following formula (2), for example. The control unit 14 may continue to control the ankle joint 122 to follow the corrected target angle θref_c1(t) at least while the leg link LR is a supporting leg.

$$\theta ref\_c1(t)=\theta ref(t)+A1(t) \quad (2)$$

$$\theta ref\_c1(t)=\theta ref(t)-A1(t) \quad (2)$$

Note that if the leg link LR, which is a swinging leg, moves away again from the road surface to be a swinging leg, then the correction amount A1(t) for the target angle θref(t) may be converged to zero by the time constant during the swinging phase. This enables the posture of the foot 131R when the leg link LR lands again to be predetermined posture according to the target angle θref(t). This prevents an unexpected contact between an object in the walking environment and the foot 131R from being occurred, which is caused by continuing, even during the swinging phase, the corrected posture of the foot 131R that changed conforming to the bump on the road surface.

Figure 5:
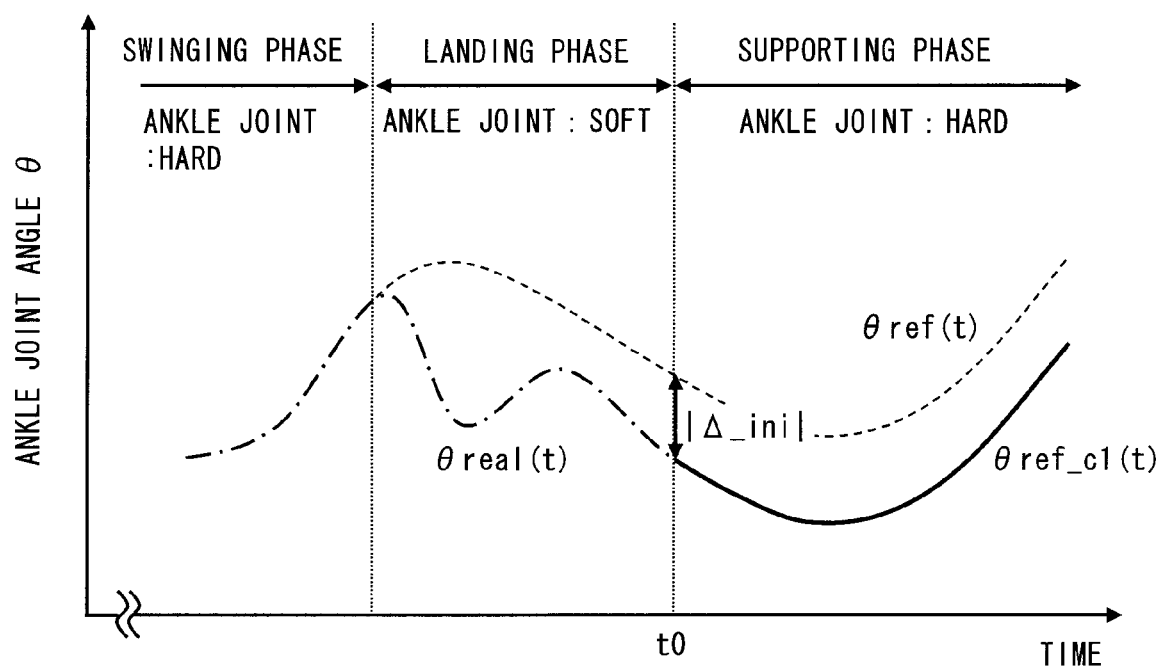
FIG. 5 is a graph showing the time change of an ankle joint angle of the legged mobile robot in accordance with the first exemplary embodiment of the present invention.

FIG. 5 is a graph showing the relationship between the real angle θreal(t) of the ankle joint 122, the target angle θref(t), and the corrected target angle θref_c1(t). The dot-and-dash line of FIG. 5 indicates the time change of the real angle θreal(t), and the dashed line of FIG. 5 indicates the trajectory of the target angle θref(t). The solid line of FIG. 5 indicates the trajectory of the corrected target angle θref_c1(t).

In FIG. 5, the real angle θreal(t) is controlled to follow the prespecified target angle θref(t), while the leg link LR is in the swinging phase. Next, turning to the landing phase when the leg link LR lands, as the ankle joint 122 is in the soft state, the real angle θreal(t) varies according to the road profile. Accordingly, the real angle θreal(t) deviates from the target angle θref(t). Then, the leg link LR is made to be the supporting leg when passing the point t0, the landing completed point of the leg link LR, thus the ankle joint 122 is made hard. This enables the ankle joint 122 to follow the corrected target angle θref_c1(t). Note that the real angle θreal(t0) and the corrected target angle θref_c1(t) are continuous at the starting point t0, where the ankle joint 122 starts following the corrected target angle θref_c1(t).

As mentioned above, the robot 100 in accordance with this embodiment makes the ankle joint 122 soft before the foot 131R lands. Then, after the foot 131R lands, and when making the ankle joint 122 hard in order for the real angle of the ankle joint 122, which has changed conforming to the road profile, to follow the target angle, the target angle θref(t) to be followed by the ankle joint 122 is corrected by the correction amount A1(t) indicated in the formula (1). The corrected target angle θref_c1(t) is continuous with the real angle θreal(t0) at the starting point t0 where the ankle 122 is made hard, thus the unstable behavior of the robot 100 due to a rapid change of the angle joint 122 will not be generated. That is, the robot 100 in accordance with this embodiment is able to suppress the generation of an unstable behavior caused by the ankle joint 122 rapidly following the original target angle θref(t0) different from the real angle θreal(t0).

Second Exemplary Embodiment

Figure 9:
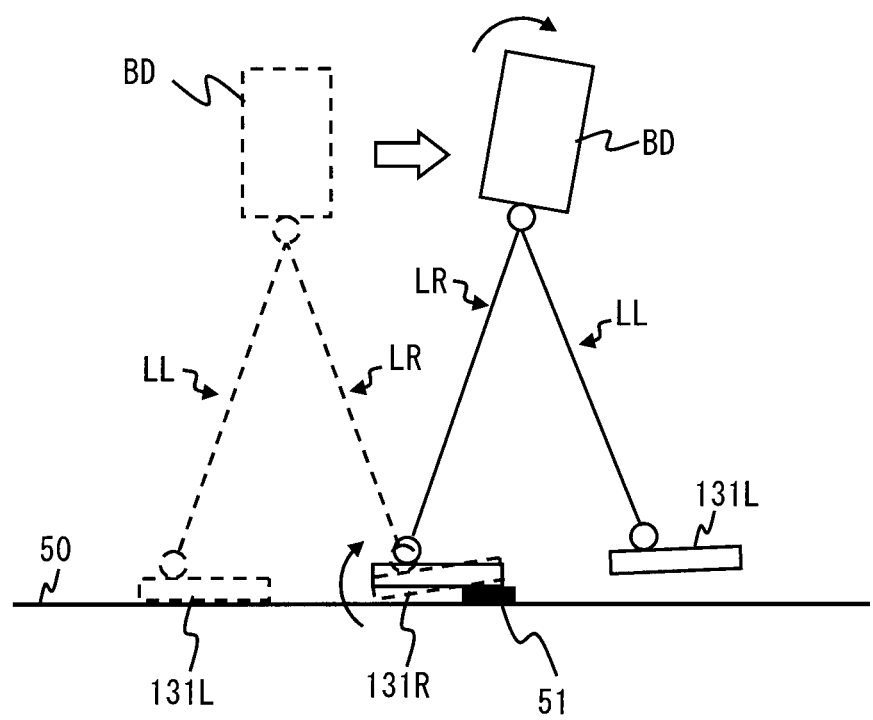
FIG. 9 is a side view of the legged mobile robot referred in order to explain a change of installation condition of feet and the road surface.

In the abovementioned first exemplary embodiment, the correction amount A1(t) to be added to the target angle θref(t) is a constant value Δini, which is determined according to the real angle θreal(t0). If the difference Δini accurately represents the road profile, the correction of the target angle θref(t) using the correction amount A1(t) determined by the formula (1) is appropriate. However, the leg link LR lands in a short time, for example about 0.1 second, thus there can be difficult cases to calculate, at any time, the accurate real angle θreal(t0) and the difference Δini while walking. Moreover, as shown in FIG. 9, while the leg link LR is a supporting leg after the foot 131R completed to land and the difference Δini was determined, if the contact state between the bottom surface of the foot 131R and the road surface 50 changes, the correction of the target angle θref(t) using the difference Δini lacks validity.

Therefore, in order to further improve the walking stability of the robot 100, the legged mobile robot of this embodiment calculates a correction amount A2(t) for the target angle θref(t) using the following formula (3).

$$A2(t)=\Delta ini+\Delta\phi(t) \quad (3)$$

Figure 6A:
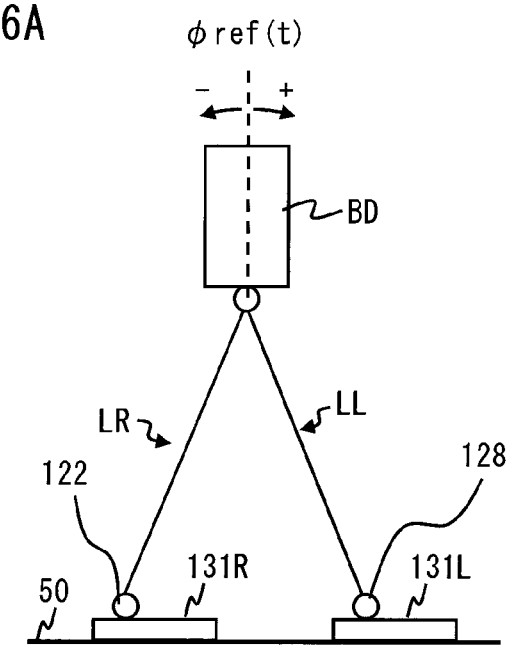
FIG. 6A is a side view of a legged mobile robot referred in order to explain the definition of parameters used in a second exemplary embodiment of the present invention.
Figure 6B:
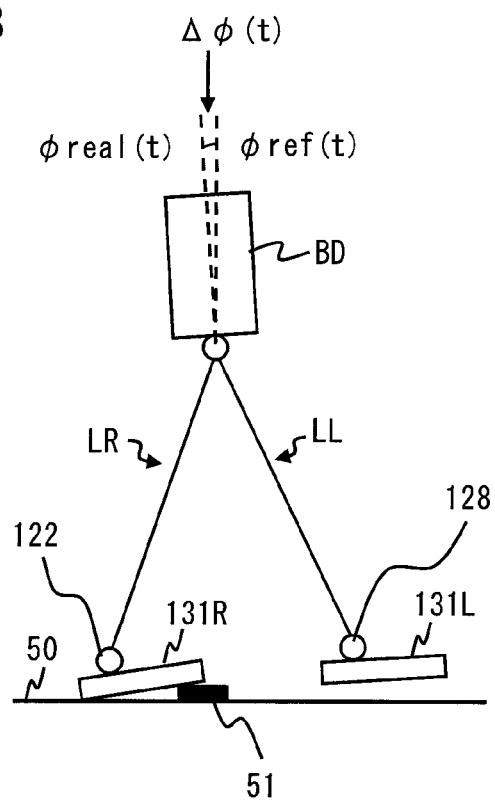
FIG. 6B is a side view of the legged mobile robot referred in order to explain the definition of parameters used in the second exemplary embodiment of the present invention.

Here, Δφ is the difference between the real angle φreal(t) and the target angle φref(t) of a posture angle of the trunk unit BD. FIGS. 6A and 6B show the relationship between the target angle φref(t), the real angle φreal(t), and the difference Δφ(t). As shown in FIG. 6A, the target angle φref(t) is a posture angle trajectory of the trunk unit BD planned beforehand in order to walk the known road surface 50. Here, for the φref(t), the direction of gravity is zero reference, the direction to lean forward therefrom is a positive direction, and the direction to lean backward therefrom is a negative direction. The φreal(t) is the real angle of the posture angle of the trunk unit BD. The real angle φreal(t) may be detected by a gyro sensor (not shown). If there is a disturbance factor such as the unknown convex bump 51 of FIG. 6B, a deviation is generated between the real angle φreal(t) and the target angle φref(t). This deviation is the difference Δφ(t) and is defined by the following formula (4).

$$\Delta\phi(t)=\phi real(t)-\phi ref(t) \quad (4)$$

Figure 7:
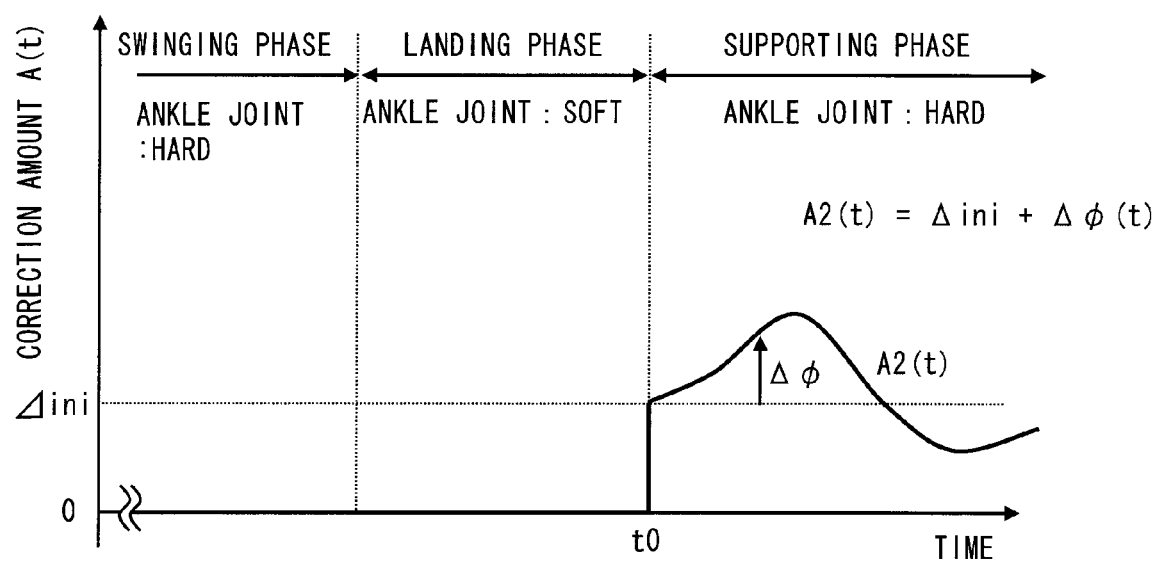
FIG. 7 is a graph showing the correction amount of an ankle joint target angle in accordance with the second exemplary embodiment of the present invention.

FIG. 7 shows an example of the time change of the correction amount A2(t) represented by the formula (3). The graph indicated by the solid line of FIG. 7 is the correction amount A2(t). Accordingly, in this embodiment, Δini at the time t0 is calculated and after increasing the control gain for making the ankle joint 122 hard, the difference Δϕ(t) between the real angle ϕreal(t) for the absolute coordinate of the trunk unit BD and the target angle ϕref(t) is reflected to the correction amount for the ankle joint angle.

The target angle θref_c2(t), which is corrected by the correction amount A2(t) shown in the formula (3), can be represented by the following formula (5). That is, if the trunk unit BD leans forward from the target angle, the target angle of the ankle joint is adjusted toward the direction for the trunk unit BD to lean backward. Conversely, if the trunk unit BD leans backward from the target angle, the target angle of the ankle joint is adjusted toward the direction for the trunk unit BD to lean forward.

$$\theta ref\_c2(t)=\theta ref(t)+A2(t)=\theta ref\_c1(t)+\Delta\phi(t) \quad (5)$$

Figure 8A:
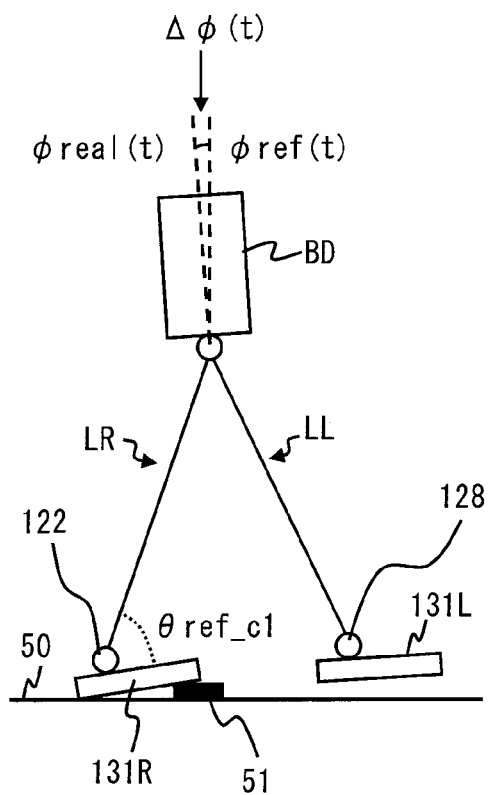
FIG. 8A is a side view of the legged mobile robot referred in order to explain the detail of the correction of the ankle joint target angle in accordance with the second exemplary embodiment of the present invention.
Figure 8B:
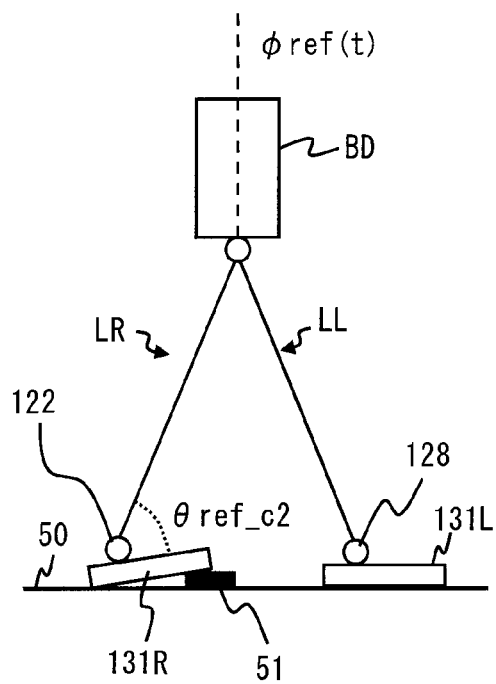
FIG. 8B is a side view of the legged mobile robot referred in order to explain the detail of the correction of the ankle joint target angle in accordance with the second exemplary embodiment of the present invention.

The contrast between the target angle θref_c1(t) of the ankle joint 122 adopted in the first exemplary embodiment of the present invention and the target angle θref_c2(t) adopted in this embodiment is shown in FIGS. 8A and 8B. In the side view of FIG. 8A, the ankle joint 122 follows the target angle θref_c1(t), however due to an error in the Δini, FIG. 8A shows the posture angle difference Δϕ being generated. Thus, when an error is included in θref_c1(t), a deviation could be generated in the height of the foot 131L of the leg link LL which lands next against the road surface 50. Such a deviation generated in the height causes the timing of landing to differ from the estimated time, and also increases the impact when the foot 131L lands. This leads to an unstable walk motion.

On the other hand, the side view of FIG. 8B shows the state in which the ankle joint 122 follows the target angle θref_c2(t) by reflecting the deviation in the posture angle Δϕ(t) to the target angle θref_c2(t) of the ankle joint. It is possible to suppress from generating a position error of the subsequently landing leg link LL by reflecting the deviation Δϕ(t) of the posture angle to correct the target angle of the ankle joint, and thus the walk motion can be stabilized.

Note that the structure of the legged mobile robot of this embodiment and the entire control procedure when the swinging leg lands are same as the abovementioned first exemplary embodiment of the present invention except the point that the abovementioned correction amount A2(t) is used by the control unit 14 for the landing control of the leg link.

Other Exemplary Embodiments

In the abovementioned first and the second exemplary embodiments, control of the pitch direction ankle joints 122 and 128 is described in detail for simplicity of explanation. However, needless to say, the present invention can be incorporated into the control of the roll direction ankle joints 123 and 129, not only the pitch direction joints 122 and 128. Further, the present invention can be incorporated into the control of other leg joints such as the knee joint, not limited to the ankle joint. Moreover, the first and the second exemplary embodiments explained that the feet 131R and L do not have joints, however the feet 131R and L may have toe joints. That is, each of the foot 131R and L is divided into a foot base unit and a toe unit, and may be configured in a way that the toe unit is rotatably coupled to the foot base unit via the toe joint. The present invention may be incorporated into the control of the toe joints in the legged mobile robot configured in this way.

Furthermore, in the abovementioned first and the second exemplary embodiments, it is explained that the robot 100 itself recognizes the environment to generate an environmental map, generates gait data based on the generated environmental map, and generates the target angle trajectories of the leg joints based on the generated gait data. However, the environmental map data, the gait data, and the target angle trajectory data of the leg joints may be input externally into the robot 100 to hold it.

Moreover, the present invention is not limited to the abovementioned exemplary embodiments but various changes may be made within the scope of the present invention.

The invention claimed is:

1. A walking control method for a legged mobile robot comprising a plurality of leg links and a trunk unit, each of the plurality of leg links having a plurality of leg joints, the method comprising:
   controlling, when a first leg link that is a swinging leg among the plurality of leg links lands on a road surface, a driving unit which drives a first leg joint included in the plurality of leg joints of the first leg link, except a leg joint being connected to the trunk unit, so that the first leg joint is made soft in order to change a real angle of the first leg joint of the first leg link landing on the road surface according to a shape of the road surface without following a trajectory of a target angle determined beforehand;
   after the first leg link lands, in a state where the trajectory of the target angle is corrected to cancel out a difference between the real angle of the first leg joint in beginning to make the first leg joint hard and the target angle, controlling the driving unit so that the first leg joint is made hard in order for the real angle of the first leg joint of the first leg link, which has become a supporting leg, to follow the corrected trajectory of the target angle.

2. The method according to claim 1, wherein a softness of the first leg joint is changed by changing a following speed to the target angle of the first leg joint.

3. The method according to claim 1, wherein a softness of the first leg joint is changed by increasing or decreasing an output torque of the driving unit.

4. The method according to claim 1, wherein the correction of the trajectory of the target angle is performed by adding to the target angle, the difference between the real angle of the first leg joint at the time of making the first leg joint hard and the target angle.

5. The method according to claim 1, wherein the correction of the target angle is performed by adding to the target angle, the difference between the real angle of the first leg joint at the time of making the first leg joint hard and the target angle, and a difference between a target posture angle of the trunk unit and a real posture angle of the trunk unit.

6. The method according to claim 1, wherein a correction amount for the target angle is set to 0 after the first leg link enters a swinging phase again.

7. The method according to claim 1, wherein
   a foot is provided to a tip of the leg link, and
   the first leg joint is an ankle joint which rotatably supports the foot.

8. The method according to claim 1, wherein
   a foot is provided to a toe of the leg link,
   the foot comprises a foot base unit, a toe unit, and a toe joint which rotatably couple the toe unit to the foot base unit, and
   the first leg joint is the toe joint.

9. A legged mobile robot comprising:
   a trunk unit;
   a plurality of leg links coupled to the trunk unit, each leg link having a plurality of leg joints;
   a driving unit which drives the leg joint; and a control unit which controls the driving unit so that a real angle of the leg joint follows a trajectory of a target angle specified beforehand, wherein the control unit controls, when a first leg link that is a swinging leg among the plurality of leg links lands on a road surface, the driving unit so that the first leg joint included in the plurality of leg joints of the first leg link is made soft in order to change a real angle of the first leg joint according to a shape of the road surface without following the trajectory of the target angle determined beforehand, and wherein, after the first leg link lands, in a state where the trajectory of the target angle is corrected based on a difference between the real angle of the first leg joint in beginning to make the first leg joint hard and the target angle specified beforehand, the control unit controls the driving unit so that the first leg joint is made hard in order for the real angle of the first leg joint of the first leg link, which has become a supporting leg, to follow the corrected trajectory of the target angle.

10. The legged mobile robot according to claim 9, wherein the control unit corrects the trajectory of the target angle by adding to the target angle, the difference between the real angle of the first leg joint at the time of making the first leg joint hard and the target angle.

11. The legged mobile robot according to claim 9, wherein the control unit corrects the trajectory of the target angle by adding to the target angle, the difference between the real angle of the first leg joint at the time of making the first leg joint hard and the target angle, and a difference between a target posture angle of the trunk unit and a real posture angle of the trunk unit.

12. The legged mobile robot according to claim 9, wherein the control unit sets a correction amount for the target angle to 0 after the first leg link enters a swinging phase again.

* * * * *